United States Patent [19]

Togawa et al.

[11] Patent Number: 4,841,624
[45] Date of Patent: Jun. 27, 1989

[54] METHOD OF PRODUCING A THIN FILM MAGNETIC HEAD

[75] Inventors: Eisei Togawa, Odawara; Saburo Suzuki, Minamiashigara; Kenji Sugimoto; Shunichiro Kuwatsuka, both of Odawara, all of Japan

[73] Assignee: Hitachi, Ltd., Tokyo, Japan

[21] Appl. No.: 142,696

[22] Filed: Jan. 11, 1988

[30] Foreign Application Priority Data

Jan. 13, 1987 [JP] Japan ................................ 62-4081

[51] Int. Cl.⁴ .............................................. G11B 5/42
[52] U.S. Cl. .................................... 29/603; 156/656; 360/119; 427/116; 427/131
[58] Field of Search ................... 427/116, 131; 29/603; 360/119–121; 156/656

[56] References Cited

U.S. PATENT DOCUMENTS 4,550,353 10/1985 Hirai et al. ..................... 29/603 X

FOREIGN PATENT DOCUMENTS 258715 12/1985 Japan .
32212 2/1986 Japan .

Primary Examiner—Carl E. Hall
Attorney, Agent, or Firm—Fay, Sharpe, Beall, Fagan, Minnich & McKee

[57] ABSTRACT

A method of producing a thin film magnetic head by successively depositing on a substrate a first magnetic material, a gap material, an electrically conductive material consisting of a coil, an insulating film, a second magnetic material and a protecting film, wherein the improvement comprises a step for forming a recessed portion in the insulating film at a portion corresponding to a gap portion on the air bearing surface side, the bottom surface of said recessed portion serving as an exposed portion on the upper surface of the gap material and the side surfaces of said recessed portion being tapered, a step for forming a recessed portion in the gap material by etching using the insulating film with the recessed portion as a mask and making the thickness thereof equal to the gap length, and a step for depositing a second magnetic material on the whole surface, so that the recessed portion formed in the gap material will have a rectangular shape with its one side being equal to a gap depth and its another side being equal to a track width. Unlike the conventional art, no thick photoresist film is used in a step for determining the gap depth and the track width, making it possible to obtain a thin film magnetic head having a small gap depth and a narrow track width maintaining high precision.

9 Claims, 2 Drawing Sheets

METHOD OF PRODUCING A THIN FILM MAGNETIC HEAD

BACKGROUND OF THE INVENTION

The present invention relates to a method of producing a thin film magnetic head, and more particularly to a method of producing a thin film magnetic head having a narrow track width and a small gap depth adapted to high-density recording and reproducing.

According to the conventional methods of producing thin film magnetic heads, the heads have been produced so that the crush resistance will not be lost even in the case of a small gap depth as is disclosed in Japanese Patent Laid-Open No. 258715/1985 and Japanese Patent Laid-Open No. 32212/1986.

In recent years, however, the thin film magnetic heads have been so designed as to achieve higher density recording and reproducing than those of the conventional art. In the conventional technology, much attention has not been given to forming narrow track widths maintaining high precision or to forming small gap depths, that are essential for achieving the above object.

In the conventional method of producing thin film magnetic heads, the track width and its precision are determined by the photoresist pattern at the time of forming an upper magnetic material of the thin film magnetic head. That is, in forming a photoresist pattern to form the upper magnetic material, if the thickness of the photoresist film is selected to be 3 to 4 $\mu$m and the height of the upper magnetic material from the gap layer to be 10 to 12 $\mu$m, the thickness of the photoresist film becomes 13 to 16 $\mu$m near the lower tapered edge of an organic insulating layer that forms a step with respect to the gap layer, i.e., near a portion that determines the track width, making it difficult to form a track width maintaining precision or to form a track width which is smaller than the thickness of the resist film. According to the conventional technology, therefore, attention has not been given to forming a track width maintaining high precision, forming a narrow track width or forming a small gap width. Furthermore, due to the step caused by forming a thick organic insulating film, the upper magnetic material that determines the track width cannot be formed so precisely.

SUMMARY OF THE INVENTION

The present invention is accomplished in view of the problems inherent in the conventional art, and its object is to provide a method of producing a thin film magnetic head, that includes forming a narrow track width maintaining high precision and a small gap depth.

In order to achieve the above object, the present invention deals with a method of producing a thin film magnetic head by successively depositing on a substrate a first magnetic material, a gap material, an electrically conductive material consisting of a coil, an insulating film, a second magnetic material, and a protecting film. The method includes a step (i) for forming the insulating film followed by forming a recessed portion in said insulating film in a region where there exists no conductive material on the air bearing surface side. The recessed portion has a rectangular shape in cross section that is in parallel with the gap material layer and is tapered on the side surfaces, the gap material being exposed on the bottom of the recessed portion, and a portion where the gap material is exposed corresponding to a position where a gap is formed in the magnetic head. A step (ii) is included for removing the gap material by etching using the insulating film as a mask until the thickness of the gap material becomes equal to a predetermined gap length; and for removing unnecessary portions of the gap material and unnecessary portions of the insulating film. Further a step for forming said second magnetic material on the whole surface is included followed by shaping for example, by photo-etching.

In the step (i), the insulating film is formed by, for example, spin-coating an organic insulating film followed by thermosetting. As is well known, a recessed portion which is tapered at an angle of 30 to 50 degrees is formed by wet-etching using a negative-type photoresist. In the step (ii), use is made of an etching method in which the etching rate of the insulating film is nearly equal to the etching rate of the gap material, the gap material is tapered at an angle nearly equal to the tapered angle of the insulating film, so that the tapered angle of the insulating film is transferred to the gap material.

The gap material should have a thickness of 2 to 5 $\mu$m before being etched. When the thickness is smaller than 2 $\mu$m, the recording and reproducing may take place in the portions other than the gap portion and when the thickness is greater than 5 $\mu$m, precision for etching decreases and the etching is carried out requiring an extended period of time and resulting in an increase in the manufacturing cost.

The above-mentioned step (ii) can be replaced by a step (ii') for removing thoroughly the gap material on the bottom of the recessed portion by etching using the insulating film as a mask, and then depositing the gap material to a thickness equal to the predetermined gap length.

In other words, in order to achieve the above object according to the present invention, a tapered recessed portion of a rectangular shape is formed in an insulating film so that the gap material is exposed. In a step occurring before the second magnetic material is formed, the gap material under this condition is subjected to the etching with the insulating film as a mask. As a result of etching the gap material on the bottom of the recessed portion, a tapered recessed portion is formed in the gap material on the first magnetic material, a proper gap length is obtained on the rectangular bottom of the recessed portion that is in parallel with the surface of the substrate, and the one side of the bottom has a size equal to the track width and the other side has a size nearly equal to a maximum gap depth. The rectangular bottom is formed under the condition free from the effect of step (i) and, hence, the dimensional precision thereof can be formed to a high degree. By forming an upper magnetic material thereon, furthermore, the first magnetic material and the second magnetic material are opposed to each other with the gap material of a suitable gap length sandwiched therebetween to obtain a thin film magnetic head having a narrow track width and a small gap depth maintaining high precision.

According to the present invention as described above, rectangular recessed portion (tapered) is formed in the gap material without being affected by the step of forming the insulating film thereby achieving the formation of a narrow track width having a small gap depth simultaneously with high precision.

The track width is determined by the bottom size of the recessed portion, and the resist pattern at the time of forming the second magnetic material can be formed in a size greater than the size of the bottom of the hole without requiring high precision.

The first magnetic material and the second magnetic material are opposed to each other via a gap material over a length nearly equal to a predetermined small gap depth (maximum value) on at least the air bearing surface side, and, in comparison therewith, the gap length becomes greater in front thereof and at the back thereof. In a step of determining the gap depth, therefore, a change in the gap length of the front side is monitored through a microscope from the machining side, i.e., from the air bearing surface side so that machining is finished when a proper gap length is obtained. Therefore, a head having a small gap width can be obtained maintaining high precision obviating the need of measuring the gap depth from the upper side. By effecting the machining by only a predetermined size, furthermore, a smaller gap depth can be obtained.

DESCRIPTION OF THE PREFERRED EMBODIMENT

Figure 1A:
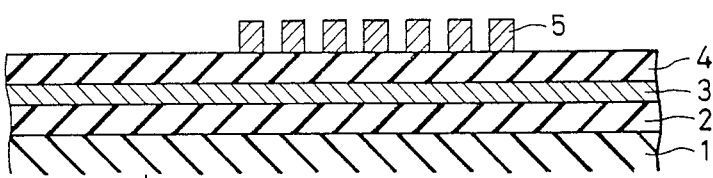
FIGS. 1a to 1e are section views illustrating the steps in a method of producing a thin film magnetic head according to an embodiment of the present invention.

FIGS. 1a to 1e are section views illustrating the steps for producing a thin film magnetic head according to an embodiment of the present invention, and particularly illustrating the central portion of an element. With reference to FIG. 1a, an underfilm 2 composed of, for example, $SiO_2$ or $Al_2O_3$ and a lower magnetic material 3 are formed successively on a ceramic substrate 1. Then, an inorganic insulating material that serves as a gap material 4 is formed maintaining a thickness greater than the gap length. When the gap length is 0.5 $\mu$m, for instance, $Al_2O_3$ is deposited as a gap material 4 on nearly the whole surface of the substrate by sputtering such that the thickness of the film will be about 2.0 $\mu$m. Furthermore, a conductor coil 5 is formed by sputtering or plating.

Figure 1B:
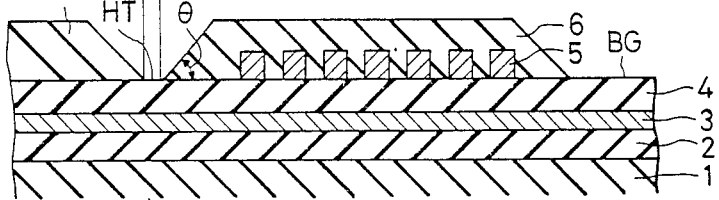

Then, as shown in FIG. 1b, an organic insulating film 6 such as a polyimide-type resin is applied thereon by spin-coating, followed by curing and wet etching using a photoresist as is widely known in order to form an insulating film 6 having a flat surface. The insulating film 6 has a tapered angle $\theta$ of 30 to 50 degrees to form a back gap portion BG that connects the lower magnetic material 3 to the upper magnetic material as well as to form a rectangular hole in the tip portion (air bearing surface side) HT of the head that forms the feature of the present invention. The insulating film 6, further, has a trapezoidal shape in cross section. The rectangular hole at the tip portion HT of the head has such a size that the bottom of a recessed portion formed by etching in the inorganic insulating film will have a predetermined track width and a predetermined gap depth in the next step of etching the inorganic insulating film. Concretely speaking, the bottom of the rectangular hole in the insulating film 6 at the tip portion HP of the head has a shape whose side perpendicular to the air bearing surface has a length equal to a maximum gap depth b (e.g., 2 $\mu$m) and whose side in parallel with the air bearing surface has a length equal to the track width a (e.g., 10 $\mu$m).

Figure 1C:
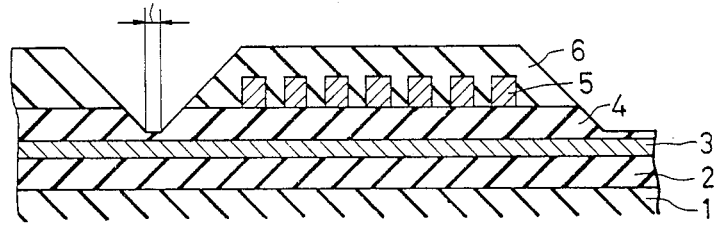

Next, as shown in FIG. 1c, the inorganic insulating film that serves as a gap material 4 is etched for a predetermined period of time using the insulating film 6 as a mask. This etching, however, is terminated when the inorganic insulating film at the tip portion HT of the head to be etched becomes equal to the gap length. For example, when the gap material (inorganic insulating film) 4 has a thickness of 2.0 $\mu$m, the etching is effected for a period of time until the film is etched by 1.5 $\mu$m, so that the film remains maintaining a thickness of 0.5 $\mu$m to form a gap length. The etching is effected such that the tapered shape of the insulating film 6 is transferred. For instance, if the etching is effected using an ion milling apparatus under the conditions of a $CF_4$ atmosphere, a $CF_4$ pressure of $1.6 \times 10^{-4}$ Torr, an acceleration voltage of 500 volts, and an ion incidence angle of 60 degrees, the etching select ratio of the gap material ($Al_2O_3$) 4 to the insulating film (polyimide-type resin) 6 becomes about 6 to 5, whereby it is made possible to transfer the tapered angle to the gap material 4, and the insulating film 6 and the gap material 4 are continuously tapered. In the bottom, at the tip portion HT of the head, of the gap material, there is formed a rectangle having a size b equal to a predetermined maximum gap depth (e.g., 2.0 $\mu$m) and a predetermined track width (e.g., 10 $\mu$m) in a direction at right angle thereto, just like the bottom of the insulating film 6 in FIG. 1b.

Dimensional precision of the above-mentioned bottom at the tip portion HT of the head is determined by the precision of photoresist pattern of the insulating film 6 and by the precision for etching the insulating film 6 and gap material 4.

In this embodiment, the rectangle of the bottom formed in the insulating film 6 at the tip portion HT of the head shown in FIG. 1b has the same size as the rectangle of bottom in the gap material 4 at the tip portion of the head shown in FIG. 1c to obtain favorable results. Depending upon the etching conditions, however, difference may develop to some extent in the size between them. When a high precision is required, therefore, it is recommended to carry out preliminary experiments under the predetermined etching conditions to find a dimensional relationship between them, in order to determine the rectangular size of bottom in the insulating film 6 at the tip portion HT of the head shown in FIG. 1b based upon the thus found relationship.

Figure 1D:
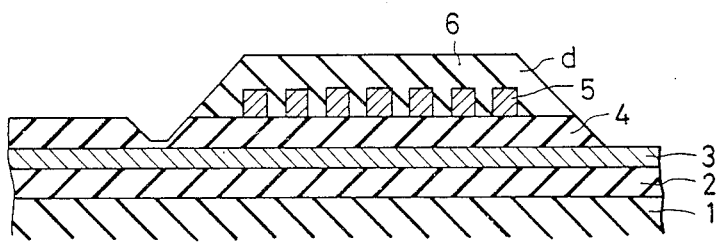

Next, as shown in FIG. 1d, there are removed the insulating film 6 except a magnetic circuit-forming portion (portion where the upper magnetic material is formed on the upper surface of the insulating material 6) d and the gap material 4 of back gap portion.

The bottom of the same shape at the tip portion HT of the head can also be formed by completely removing the gap material 4 by etching with the insulating film 6 as a mask, forming a gap material on the whole surface of the substrate, and removing the gap material from the back gap portion.

Figure 1E:
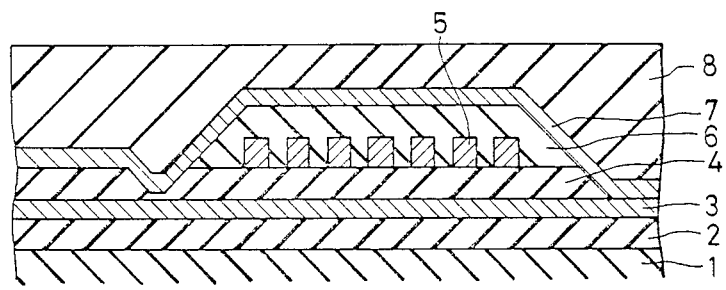

Next, the magnetic material is deposited on the whole surface and is shaped by widely known photoetching, in order to form the upper magnetic material 7. Then, a protection film 8 is formed thereon to obtain a thin film magnetic head element as shown in FIG. 1e. The track width of the upper magnetic material 7 should be greater than the track width of the inorganic insulating material 4, but needs not be formed with as high a degree of precision. Further, the insulating film 6 may be composed of either an organic material or an inorganic material provided it gives a suitable etching select ratio with respect to the gap material 4.

In this specification, the thin film magnetic head element stands for a state where a complete thin film magnetic head can be obtained by forming an air bearing surface.

Figure 2:
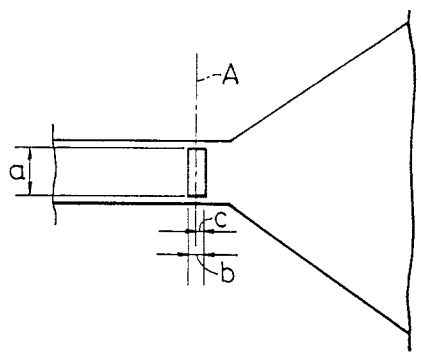
FIG. 2 is a plan view which schematically illustrates the tip of a thin film magnetic head element fabricated according to the embodiment of the present invention.
Figure 3:
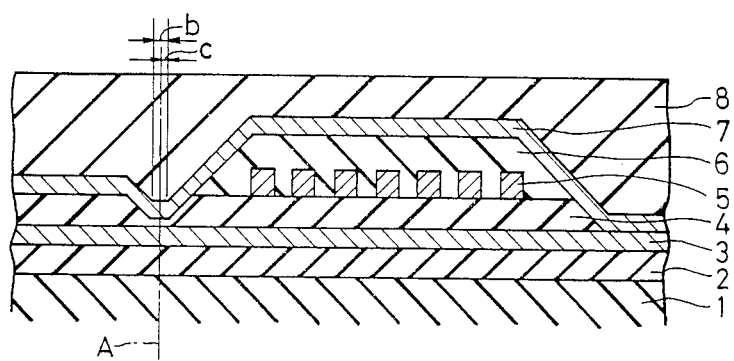
FIG. 3 is a section view for explaining a step of machining the air bearing surface of the thin film magnetic head element fabricated according to the embodiment of the present invention.
Figure 4:
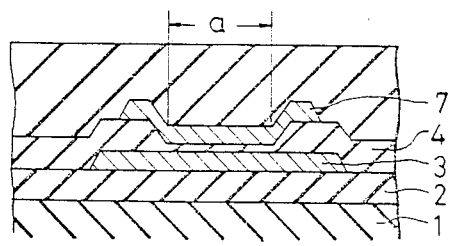
FIG. 4 is a side view of the thin film magnetic head fabricated according to the embodiment of the present invention as viewed from the side of the air bearing surface.

FIG. 2 is a plan view which schematically illustrates a portion near the tip portion HT of the head after the thin film magnetic head element has been completed. FIG. 3 is a central section view which illustrates a processing step for forming the air bearing surface of the thin film magnetic head element, and FIG. 4 is a side view which illustrates the thin film magnetic head of the air bearing surface side after the gap depth has been formed. In FIGS. 2 and 4, a size a represents a track width and a size b represents a maximum gap depth. After the thin film magnetic head element has been completed, the machining is effected from the air bearing surface side such that an optimum gap depth is realized, and the machining is stopped at a machining line A so that the gap material will have a suitable gap length. In this case, the gap depth has a size c smaller than the size b as shown in FIG. 3. In the region of a proper gap length, therefore, a thin film magnetic head having a proper gap depth and a proper track width is obtained.

The thin film magnetic head was fabricated according to this embodiment, and its performance was evaluated. It was confirmed that the thin film magnetic head possessed high performance and high reliability lending itself well for recording data at a high density.

In the aforementioned drawings, the same reference numerals represent the same portions.

According to the present invention as will be obvious from the foregoing description, it is possible to obtain a thin film magnetic head having a narrow track width and a small gap depth wherein these dimensions are maintained with high precision. Therefore, a head of high performance and high reliability adapted to record and reproduce data at a high density maintaining high yields is obtainable by following the method of the invention.

What is claimed is:

1. In a method of producing a thin film magnetic head having an air bearing surface by successively depositing on a substrate a first magnetic material, a gap material, an electrically conductive material consisting of a coil, in insulating film, a second magnetic material and a protecting film, the improvement which comprises:
   (i) a step following the depositing of said insulating film of forming a recessed portion in said insulating film in a region where there exists no conductive material on the air bearing surface side of the coil, said recessed portion having tapered side surfaces and a rectangular shape in cross section that is in parallel with said gap material layer, and of exposing the upper surface of said gap material to form a bottom surface corresponding to a position for forming the gap of said head;
   (ii) a step of removing said gap material by etching using said insulating film with said recessed portion as a mask, and making the thickness of the rectangular portion of said gap material corresponding to said recessed portion equal to a predetermined gap length;
   (iii) a step of removing unnecessary portions of said gap material and of said insulating film; and
   said step of depositing said second magnetic material being after said step (iii) has been finished and including depositing said second magnetic material onto the gap material to form a gap of the predetermined gap length.

2. A method of producing a thin film magnetic head according to claim 1, wherein said step (ii) further includes removing thoroughly said gap material on the bottom of said recessed portion by etching using said insulating film having said recessed portion as a mask, and thereafter depositing in said recessed portion a gap material to a thickness equal to a predetermined gap length.

3. A method of producing a thin film magnetic head according to claim 1, wherein said removing of said gap material in said step (ii) includes forming side surfaces that are tapered at an angle nearly equal to the tapered angle of said insulating material.

4. A method of producing a thin film magnetic head according to claim 1, wherein said step (ii) includes forming a bottom surface whose side perpendicular to the air bearing surface has a length equal to a maximum gap depth and whose side in parallel with the air bearing surface has a length equal to the track width.

5. A method of producing a thin film magnetic head according to claim 4, further including after depositing said protection film, machining the head from the air bearing surface side until a predetermined gap depth is obtained, in order to form the air bearing surface.

6. A method of making a thin film magnetic head having an air bearing surface on a substrate, comprising the steps of:
   forming a first magnetic film on the substrate;
   forming a gap film of gap material on the first magnetic film;
   forming a conductor coil on the gap film;
   forming an insulating film on said gap film covering said conductor coil;
   forming a recessed portion in said insulating film in a region remote from said conductor coil on the air bearing surface side of the magnetic head, including forming said recessed portion with a rectangular shape in cross section;
   removing the gap material underlying said recessed portion of said gap film by etching with said recessed portion of said insulating film used as a mask, and controlling the removing to leave a thickness of said gap film that corresponds to a predetermined gap length;
   forming a second magnetic film over said insulating layer and the gap film exposed by said removing to form a gap of the predetermined gap length; and
   forming a protecting film over said second magnetic film.

7. The method according to claim 6, wherein said step of forming a recessed portion includes forming a side in parallel with the air bearing surface of the thin film head with a length equivalent to the track width of said head.

8. The method according to claim 6, further comprising the step of machining said head from the air bearing surface side a predetermined depth into said recessed portion corresponding with a desired gap depth to form the air bearing surface.

9. The method according to claim 6, further comprising said step of removing said gap film including removing entirely said gap film underlying said recessed portion using said insulating film as a mask, and thereafter depositing a gap material in said recessed portion to form a thickness of gap material that corresponds to a gap of predetermined length.

* * * * *